(12) United States Patent
Hsu et al.

(10) Patent No.: US 10,853,596 B1
(45) Date of Patent: Dec. 1, 2020

(54) INTELLIGENT POSITIONING SYSTEM (71) Applicant: UNITECH ELECTRONICS CO., LTD., New Taipei (TW)

(72) Inventors: Yuan-Ying Hsu, New Taipei (TW); Miao-Tsung Wu, New Taipei (TW); Bo-Cheng Huang, New Taipei (TW); Rong-Huei Chen, New Taipei (TW)

(73) Assignee: UNITECH ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 16/690,836

(22) Filed: Nov. 21, 2019

(30) Foreign Application Priority Data

Oct. 22, 2019 (TW) .............................. 108138088 A (51) Int. Cl.
*G06K 7/10* (2006.01)
*G06K 7/14* (2006.01)
*G06N 3/08* (2006.01)
*G06N 5/02* (2006.01)

(52) U.S. Cl.
CPC ....... *G06K 7/10366* (2013.01); *G06K 7/1413* (2013.01); *G06N 3/08* (2013.01); *G06N 5/02* (2013.01)

(58) Field of Classification Search
CPC .... G06K 7/10366; H04B 10/116; G01S 13/93
USPC ......................................................... 235/451
See application file for complete search history.

(56) References Cited

U.S. PATENT DOCUMENTS

2008/0315828 A1* 12/2008 Lu ........................... H02J 7/342
320/101
2016/0353560 A1 12/2016 Bortolotti et al.
2018/0045808 A1 2/2018 Bulumulla et al.
2018/0287700 A1* 10/2018 Gummadi ............ H04B 10/116
2020/0103521 A1* 4/2020 Chiarella ................ G06F 9/542

FOREIGN PATENT DOCUMENTS

TW M480071 U 6/2014
TW M517824 U 2/2016
TW 201834412 A 9/2018

OTHER PUBLICATIONS

Office Action dated Apr. 30, 2020 of the corresponding Taiwan patent application No. 108138088.

* cited by examiner

*Primary Examiner* — Allyson N Trail
(74) *Attorney, Agent, or Firm* — Chun-Ming Shih; HDLS IPR Services (57) ABSTRACT

An intelligent positioning system includes at least one lamp apparatus and a handheld electronic apparatus. The handheld electronic apparatus includes an optical code receiving unit and an artificial intelligence positioning algorithm unit. The at least one lamp apparatus wirelessly transmits an optical code signal to the optical code receiving unit. The optical code receiving unit analyzes the optical code signal to obtain an optical identification code of the optical code signal and a light intensity value of the optical code signal. The optical code receiving unit transmits the optical identification code of the optical code signal and the light intensity value of the optical code signal to the artificial intelligence positioning algorithm unit. The artificial intelligence positioning algorithm unit converts the optical identification code of the optical code signal and the light intensity value of the optical code signal into a positioning information.

10 Claims, 6 Drawing Sheets

INTELLIGENT POSITIONING SYSTEM

BACKGROUND OF THE INVENTION

Field of the Invention

The present invention relates to a positioning system, and especially relates to an intelligent positioning system.

Description of the Related Art

The user utilizing a handheld apparatus to perform the indoor positioning to help with the routine works is very popular, for examples, to help with the shopping guidance in the shopping center, or to check and pick merchandises in the warehouse.

The positioning system, for example, the global positioning system (GPS) is very popular. However, the signals of the global positioning system cannot penetrate the house to reach indoors, so that the global positioning system cannot be applied to the indoor positioning.

Afterwards, some indoor positioning technologies are developed, for example, the related art radio frequency wireless positioning technology. However, the related art radio frequency wireless positioning technology utilizes the 2.4 GHz frequency band. The 2.4 GHz frequency band is interfered easily. In other words, because the accurate indoor positioning technology is lacking now, quickly and correctly finishing the routine works which the user utilizes the handheld apparatus to help with mentioned above just still needs to be dependent on the manpower and the experiences.

SUMMARY OF THE INVENTION

In order to solve the above-mentioned problems, an object of the present invention is to provide an intelligent positioning system.

In order to achieve the object of the present invention mentioned above, the intelligent positioning system of the present invention comprises at least one lamp apparatus and a handheld electronic apparatus. The handheld electronic apparatus is wirelessly connected to the at least one lamp apparatus. Moreover, the handheld electronic apparatus comprises an optical code receiving unit and an artificial intelligence positioning algorithm unit. The optical code receiving unit is wirelessly connected to the at least one lamp apparatus. The artificial intelligence positioning algorithm unit is electrically connected to the optical code receiving unit. Moreover, the at least one lamp apparatus is configured to wirelessly transmit an optical code signal to the optical code receiving unit. After the optical code receiving unit receives the optical code signal, the optical code receiving unit is configured to analyze the optical code signal to obtain an optical identification code of the optical code signal and a light intensity value of the optical code signal. After the optical code receiving unit obtains the optical identification code of the optical code signal and the light intensity value of the optical code signal, the optical code receiving unit is configured to transmit the optical identification code of the optical code signal and the light intensity value of the optical code signal to the artificial intelligence positioning algorithm unit. After the artificial intelligence positioning algorithm unit receives the optical identification code of the optical code signal and the light intensity value of the optical code signal, the artificial intelligence positioning algorithm unit is configured to convert the optical identification code of the optical code signal and the light intensity value of the optical code signal into a positioning information.

Moreover, in an embodiment of the intelligent positioning system of the present invention mentioned above, moreover the handheld electronic apparatus further comprises a display unit. The display unit is electrically connected to the artificial intelligence positioning algorithm unit. Moreover, after the artificial intelligence positioning algorithm unit converts the optical identification code of the optical code signal and the light intensity value of the optical code signal into the positioning information, the artificial intelligence positioning algorithm unit is configured to transmit the positioning information to the display unit. After the display unit receives the positioning information, the display unit is configured to display the positioning information.

Moreover, in an embodiment of the intelligent positioning system of the present invention mentioned above, moreover the handheld electronic apparatus further comprises a neural network operation acceleration unit. The neural network operation acceleration unit is electrically connected to the artificial intelligence positioning algorithm unit. Moreover, the neural network operation acceleration unit is configured to assist the artificial intelligence positioning algorithm unit to convert the optical identification code of the optical code signal and the light intensity value of the optical code signal into the positioning information.

Moreover, in an embodiment of the intelligent positioning system of the present invention mentioned above, moreover the artificial intelligence positioning algorithm unit is a deep neural network model.

Moreover, in an embodiment of the intelligent positioning system of the present invention mentioned above, moreover the optical code receiving unit is an optical code receiver.

Moreover, in an embodiment of the intelligent positioning system of the present invention mentioned above, moreover the optical code signal is a visible light optical code signal.

Moreover, in an embodiment of the intelligent positioning system of the present invention mentioned above, moreover the neural network operation acceleration unit is a graphics processing unit.

Moreover, in an embodiment of the intelligent positioning system of the present invention mentioned above, moreover the handheld electronic apparatus further comprises an inertial sensor. The inertial sensor is electrically connected to the artificial intelligence positioning algorithm unit. Moreover, the inertial sensor is configured to sense an action state of the handheld electronic apparatus to generate a handheld apparatus action signal. After the inertial sensor generates the handheld apparatus action signal, the inertial sensor is configured to transmit the handheld apparatus action signal to the artificial intelligence positioning algorithm unit. After the artificial intelligence positioning algorithm unit receives the handheld apparatus action signal, the optical identification code of the optical code signal and the light intensity value of the optical code signal, the artificial intelligence positioning algorithm unit is configured to convert the handheld apparatus action signal, the optical identification code of the optical code signal and the light intensity value of the optical code signal into the positioning information.

Moreover, in an embodiment of the intelligent positioning system of the present invention mentioned above, moreover the handheld electronic apparatus further comprises a wireless position signal receiving unit. The wireless position signal receiving unit is electrically connected to the artificial intelligence positioning algorithm unit. Moreover, the at least one lamp apparatus comprises a wireless position signal generator. The wireless position signal generator is wirelessly connected to the wireless position signal receiving unit. Moreover, the wireless position signal generator is configured to wirelessly transmit a wireless position signal to the wireless position signal receiving unit. After the wireless position signal receiving unit receives the wireless position signal, the wireless position signal receiving unit is configured to analyze the wireless position signal to obtain a position identification code of the wireless position signal and a wireless signal intensity value of the wireless position signal. After the wireless position signal receiving unit obtains the position identification code of the wireless position signal and the wireless signal intensity value of the wireless position signal, the wireless position signal receiving unit is configured to transmit the position identification code of the wireless position signal and the wireless signal intensity value of the wireless position signal to the artificial intelligence positioning algorithm unit. After the artificial intelligence positioning algorithm unit receives the position identification code of the wireless position signal, the wireless signal intensity value of the wireless position signal, the handheld apparatus action signal, the optical identification code of the optical code signal and the light intensity value of the optical code signal, the artificial intelligence positioning algorithm unit is configured to convert the position identification code of the wireless position signal, the wireless signal intensity value of the wireless position signal, the handheld apparatus action signal, the optical identification code of the optical code signal and the light intensity value of the optical code signal into the positioning information.

Moreover, in an embodiment of the intelligent positioning system of the present invention mentioned above, moreover the wireless position signal receiving unit is a Bluetooth signal receiver. The wireless position signal generator is a Bluetooth signal generator. The wireless position signal is a Bluetooth position signal. The position identification code is a Bluetooth position identification code. The wireless signal intensity value is a Bluetooth signal intensity value.

Moreover, in an embodiment of the intelligent positioning system of the present invention mentioned above, moreover the handheld electronic apparatus further comprises a data collector. The data collector is electrically connected to the artificial intelligence positioning algorithm unit. Moreover, after the display unit displays the positioning information, the data collector is configured to collect a merchandise identification code of a merchandise.

Moreover, in an embodiment of the intelligent positioning system of the present invention mentioned above, moreover the data collector is a barcode scanner or a wireless radio frequency identification reader.

The advantage of the present invention is to improve the accuracy of the indoor positioning without increasing the quantity of the lamp apparatuses. For example, the accuracy can achieve to be less than the distance between the lamp apparatuses, and even the accuracy can achieve to be the centimeter level. Features of the visible light allow its positioning accuracy to be higher than the positioning accuracy of the radio frequency wireless positioning technology.

Please refer to the detailed descriptions and figures of the present invention mentioned below for further understanding the technology, method and effect of the present invention achieving the predetermined purposes. It believes that the purposes, characteristic and features of the present invention can be understood deeply and specifically. However, the figures are only for references and descriptions, but the present invention is not limited by the figures.

DETAILED DESCRIPTION OF THE INVENTION

Figure 1:
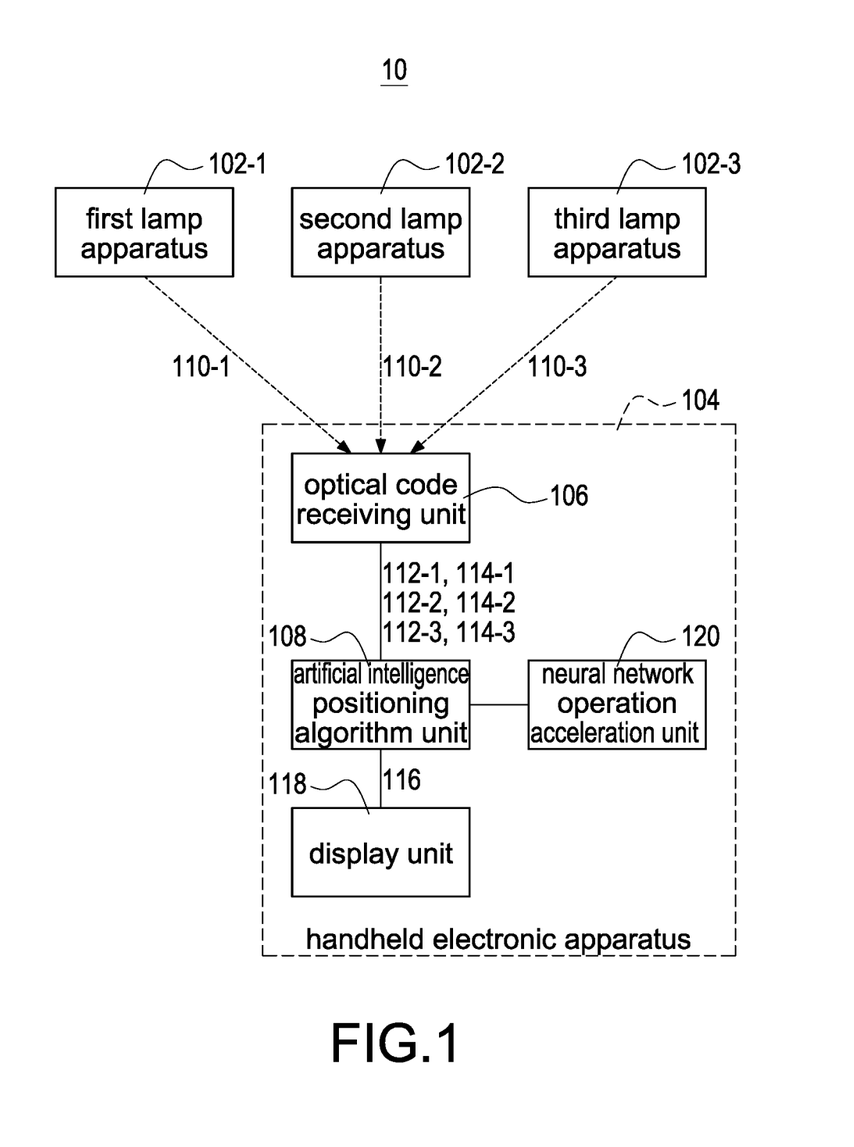
FIG. 1 shows a block diagram of the first embodiment of the intelligent positioning system of the present invention.

In the present disclosure, numerous specific details are provided, to provide a thorough understanding of embodiments of the invention. Persons of ordinary skill in the art will recognize, however, that the present invention can be practiced without one or more of the specific details. In other instances, well-known details are not shown or described to avoid obscuring aspects of the present invention. Now please refer to the figures for the explanation of the technical content and the detailed description of the present invention:

FIG. 1 shows a block diagram of the first embodiment of the intelligent positioning system of the present invention. An intelligent positioning system 10 of the present invention comprises at least one lamp apparatus (namely, a first lamp apparatus 102-1, a second lamp apparatus 102-2 and a third lamp apparatus 102-3) and a handheld electronic apparatus 104. The handheld electronic apparatus 104 comprises an optical code receiving unit 106, an artificial intelligence positioning algorithm unit 108, a display unit 118 and a neural network operation acceleration unit 120. The components mentioned above are electrically connected to each other or are wirelessly connected to each other. The artificial intelligence positioning algorithm unit 108 can be also called a positioning accurate algorithm model, which comprises a multilayer perceptron (MLP). FIG. 1 shows three lamp apparatuses; however, the present invention is not limited to this; the present invention can also comprise only one lamp apparatus, or comprise more than three lamp apparatuses.

The first lamp apparatus 102-1 is configured to wirelessly transmit (namely, broadcast) a first optical code signal 110-1 to the optical code receiving unit 106. The second lamp apparatus 102-2 is configured to wirelessly transmit (namely, broadcast) a second optical code signal 110-2 to the optical code receiving unit 106. The third lamp apparatus 102-3 is configured to wirelessly transmit (namely, broadcast) a third optical code signal 110-3 to the optical code receiving unit 106. Moreover, the first optical code signal 110-1, the second optical code signal 110-2 and the third optical code signal 110-3 are different from each other.

After the optical code receiving unit 106 receives the first optical code signal 110-1, the optical code receiving unit 106 is configured to analyze the first optical code signal 110-1 to obtain a first optical identification code 112-1 of the first optical code signal 110-1 and a first light intensity value 114-1 of the first optical code signal 110-1. After the optical code receiving unit 106 receives the second optical code signal 110-2, the optical code receiving unit 106 is configured to analyze the second optical code signal 110-2 to obtain a second optical identification code 112-2 of the second optical code signal 110-2 and a second light intensity value 114-2 of the second optical code signal 110-2. After the optical code receiving unit 106 receives the third optical code signal 110-3, the optical code receiving unit 106 is configured to analyze the third optical code signal 110-3 to obtain a third optical identification code 112-3 of the third optical code signal 110-3 and a third light intensity value 114-3 of the third optical code signal 110-3. Moreover, the first optical identification code 112-1, the second optical identification code 112-2 and the third optical identification code 112-3 are different from each other.

After the optical code receiving unit 106 obtains the first optical identification code 112-1 of the first optical code signal 110-1, the first light intensity value 114-1 of the first optical code signal 110-1, the second optical identification code 112-2 of the second optical code signal 110-2, the second light intensity value 114-2 of the second optical code signal 110-2, the third optical identification code 112-3 of the third optical code signal 110-3 and the third light intensity value 114-3 of the third optical code signal 110-3 (namely, the optical identification codes and the light intensity values), the optical code receiving unit 106 is configured to transmit the optical identification codes and the light intensity values to the artificial intelligence positioning algorithm unit 108.

After the artificial intelligence positioning algorithm unit 108 receives the optical identification codes and the light intensity values, the artificial intelligence positioning algorithm unit 108 is configured to convert the optical identification codes and the light intensity values into a positioning information 116 (namely, operate/calculate the optical identification codes and the light intensity values by the artificial intelligence to obtain the positioning information 116). After the artificial intelligence positioning algorithm unit 108 converts the optical identification codes and the light intensity values into the positioning information 116, the artificial intelligence positioning algorithm unit 108 is configured to transmit the positioning information 116 to the display unit 118. After the display unit 118 receives the positioning information 116, the display unit 118 is configured to display the positioning information 116. Therefore, the user using the handheld electronic apparatus 104 can be aware of the current position.

The neural network operation acceleration unit 120 is configured to assist the artificial intelligence positioning algorithm unit 108 to convert the optical identification codes and the light intensity values into the positioning information 116. The handheld electronic apparatus 104 is, for example but not limited to, a smartphone or an industrial personal digital assistant (PDA). The artificial intelligence positioning algorithm unit 108 is, for example but not limited to, a deep neural network model. The optical code receiving unit 106 is, for example but not limited to, an optical code receiver. The optical code signal 110 is, for example but not limited to, a visible light optical code signal. The neural network operation acceleration unit 120 is, for example but not limited to, a graphics processing unit (GPU).

Figure 2:
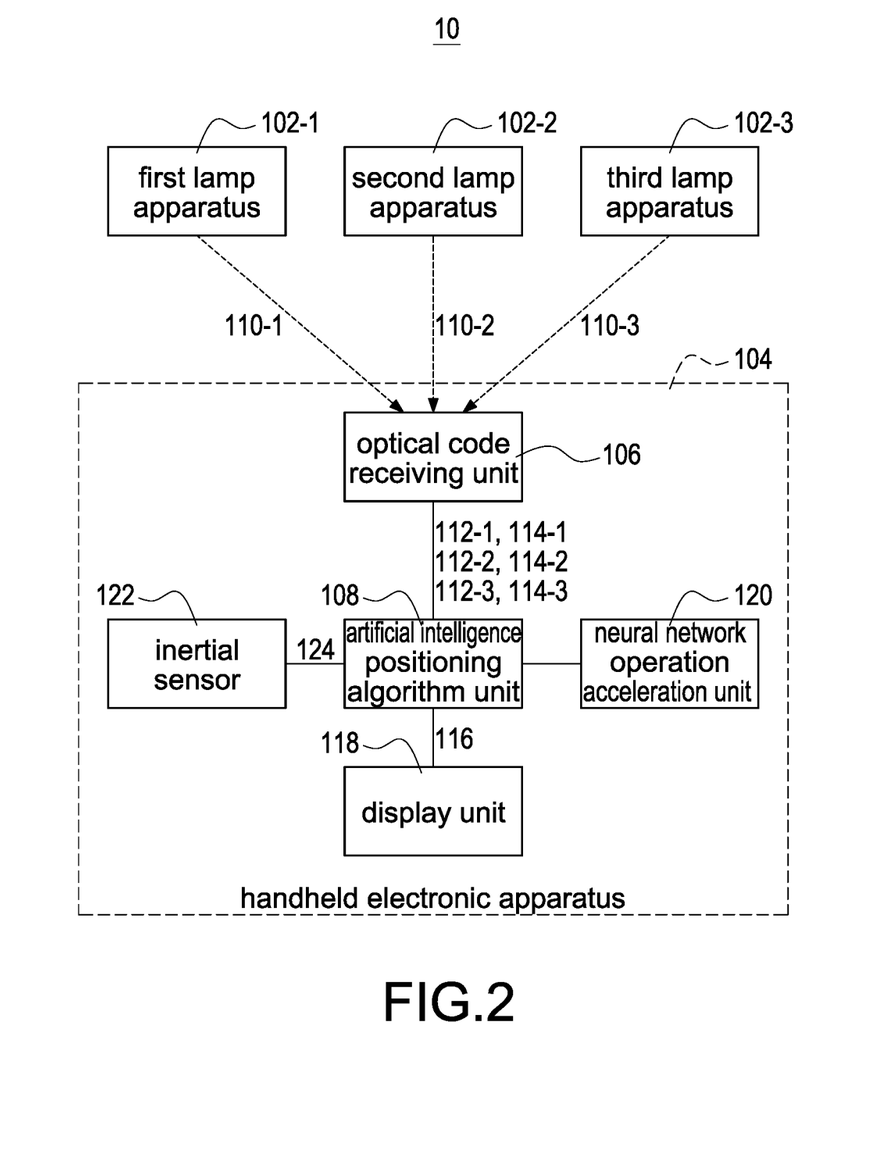
FIG. 2 shows a block diagram of the second embodiment of the intelligent positioning system of the present invention.

FIG. 2 shows a block diagram of the second embodiment of the intelligent positioning system of the present invention. The descriptions of the elements shown in FIG. 2 which are the same as the elements shown in FIG. 1 are not repeated here for brevity. The handheld electronic apparatus 104 further comprises an inertial sensor 122. The inertial sensor 122 is electrically connected to the artificial intelligence positioning algorithm unit 108.

The inertial sensor 122 is configured to sense an action state of the handheld electronic apparatus 104 to generate a handheld apparatus action signal 124. After the inertial sensor 122 generates the handheld apparatus action signal 124, the inertial sensor 122 is configured to transmit the handheld apparatus action signal 124 to the artificial intelligence positioning algorithm unit 108. After the artificial intelligence positioning algorithm unit 108 receives the handheld apparatus action signal 124, the optical identification codes and the light intensity values, the artificial intelligence positioning algorithm unit 108 is configured to convert the handheld apparatus action signal 124, the optical identification codes and the light intensity values into the positioning information 116.

In other words, compared with the embodiment of FIG. 1, the embodiment of FIG. 2 increases the inertial sensor 122 to synthetically consider the handheld apparatus action signal 124, the optical identification codes and the light intensity values to obtain the more accurate positioning information 116.

Figure 4:
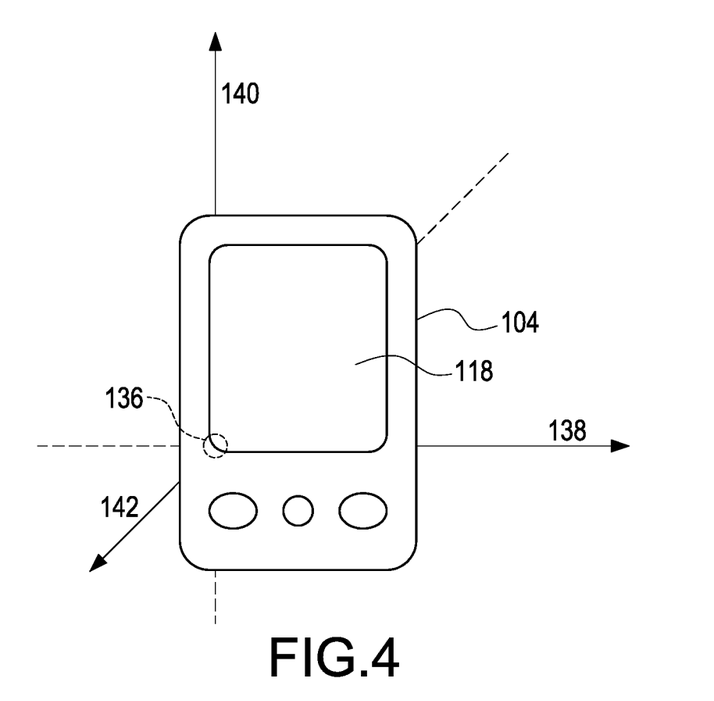
FIG. 4 shows a coordinate graph of the application of the inertial sensor of the present invention.

FIG. 4 shows a coordinate graph of the application of the inertial sensor of the present invention. FIG. 4 shows an origin 136, an X axis 138, a Y axis 140 and a Z axis 142. The solid line from the origin 136 to the X axis 138 indicates that the coordinate x value of the handheld electronic apparatus 104 increases. The dashed line from the origin 136 to the X axis 138 indicates that the coordinate x value of the handheld electronic apparatus 104 decreases. The solid line from the origin 136 to the Y axis 140 indicates that the coordinate y value of the handheld electronic apparatus 104 increases. The dashed line from the origin 136 to the Y axis 140 indicates that the coordinate y value of the handheld electronic apparatus 104 decreases. The solid line from the origin 136 to the Z axis 142 indicates that the coordinate z value of the handheld electronic apparatus 104 increases. The dashed line from the origin 136 to the Z axis 142 indicates that the coordinate z value of the handheld electronic apparatus 104 decreases.

Besides the inertial sensor 122, the present invention can also add the sensors which are built in the smartphone, for examples, the motion sensors, the environmental sensors and/or the position sensors, to synthetically consider the signals which are sensed/sent by the motion sensors, the signals which are sensed/sent by the environmental sensors, the signals which are sensed/sent by the position sensors, the handheld apparatus action signal 124, the optical identification codes and/or the light intensity values to obtain the more accurate positioning information 116. Moreover, the motion sensors mentioned above can comprise an acceleration meter, a gravity sensor, a gyroscope and a rotation vector sensor. The environmental sensors mentioned above can comprise a barometer, a photometer and a thermometer. The position sensors mentioned above can comprise an orientation/direction sensor and a magnetometer. The data sensed by the sensors can be the input parameters of the deep learning of the present invention.

Figure 3:
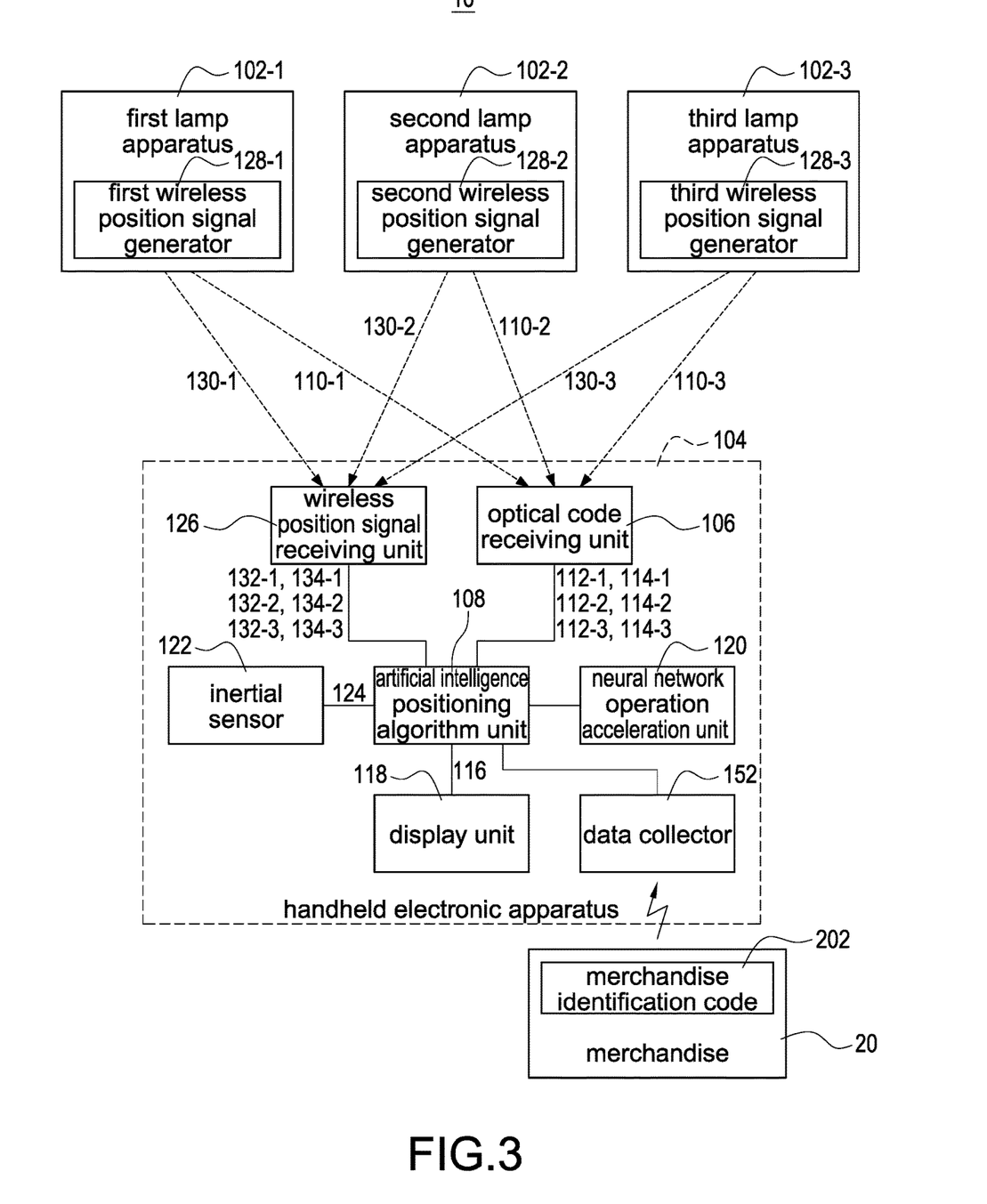
FIG. 3 shows a block diagram of the third embodiment of the intelligent positioning system of the present invention.

FIG. 3 shows a block diagram of the third embodiment of the intelligent positioning system of the present invention. The descriptions of the elements shown in FIG. 3 which are the same as the elements shown in FIG. 2 are not repeated here for brevity. The handheld electronic apparatus 104 further comprises a wireless position signal receiving unit 126 and a data collector 152. The components mentioned above are electrically connected to each other. The data collector 152 is, for example but not limited to, a barcode scanner or a wireless radio frequency identification reader. The first lamp apparatus 102-1 comprises a first wireless position signal generator 128-1. The first wireless position signal generator 128-1 is wirelessly connected to the wireless position signal receiving unit 126. The second lamp apparatus 102-2 comprises a second wireless position signal generator 128-2. The second wireless position signal generator 128-2 is wirelessly connected to the wireless position signal receiving unit 126. The third lamp apparatus 102-3 comprises a third wireless position signal generator 128-3. The third wireless position signal generator 128-3 is wirelessly connected to the wireless position signal receiving unit 126.

The first wireless position signal generator 128-1 is configured to wirelessly transmit a first wireless position signal 130-1 to the wireless position signal receiving unit 126. The second wireless position signal generator 128-2 is configured to wirelessly transmit a second wireless position signal 130-2 to the wireless position signal receiving unit 126. The third wireless position signal generator 128-3 is configured to wirelessly transmit a third wireless position signal 130-3 to the wireless position signal receiving unit 126. Moreover, the first wireless position signal 130-1, the second wireless position signal 130-2 and the third wireless position signal 130-3 are different from each other.

After the wireless position signal receiving unit 126 receives the first wireless position signal 130-1, the wireless position signal receiving unit 126 is configured to analyze the first wireless position signal 130-1 to obtain a first position identification code 132-1 of the first wireless position signal 130-1 and a first wireless signal intensity value 134-1 of the first wireless position signal 130-1. After the wireless position signal receiving unit 126 receives the second wireless position signal 130-2, the wireless position signal receiving unit 126 is configured to analyze the second wireless position signal 130-2 to obtain a second position identification code 132-2 of the second wireless position signal 130-2 and a second wireless signal intensity value 134-2 of the second wireless position signal 130-2. After the wireless position signal receiving unit 126 receives the third wireless position signal 130-3, the wireless position signal receiving unit 126 is configured to analyze the third wireless position signal 130-3 to obtain a third position identification code 132-3 of the third wireless position signal 130-3 and a third wireless signal intensity value 134-3 of the third wireless position signal 130-3. Moreover, the first position identification code 132-1, the second position identification code 132-2 and the third position identification code 132-3 are different from each other.

After the wireless position signal receiving unit 126 obtains the first position identification code 132-1 of the first wireless position signal 130-1, the first wireless signal intensity value 134-1 of the first wireless position signal 130-1, the second position identification code 132-2 of the second wireless position signal 130-2, the second wireless signal intensity value 134-2 of the second wireless position signal 130-2, the third position identification code 132-3 of the third wireless position signal 130-3 and the third wireless signal intensity value 134-3 of the third wireless position signal 130-3 (namely, the position identification codes and the wireless signal intensity values), the wireless position signal receiving unit 126 is configured to transmit the position identification codes and the wireless signal intensity values to the artificial intelligence positioning algorithm unit 108.

After the artificial intelligence positioning algorithm unit 108 receives the position identification codes, the wireless signal intensity values, the handheld apparatus action signal 124, the optical identification codes and the light intensity values, the artificial intelligence positioning algorithm unit 108 is configured to convert the position identification codes, the wireless signal intensity values, the handheld apparatus action signal 124, the optical identification codes and the light intensity values into the positioning information 116.

A usage situation of the present invention is that: the user holds the handheld electronic apparatus 104 by the user's hand, and the user moves, and then the display unit 118 will display and update the positioning information 116 (namely, to display the position of the user at this time). After the display unit 118 displays the positioning information 116, if the user arrives the destination (for example, a position of a merchandise 20), the user can operate the handheld electronic apparatus 104 to allow the data collector 152 to collect a merchandise identification code 202 of the merchandise 20, or to perform other works and items related to the merchandise 20. Therefore, the accuracy of, for example, the shopping guidance in the shopping center, or checking and picking merchandises in the warehouse can be improved.

The wireless position signal receiving unit 126 is, for example but not limited to, a Bluetooth signal receiver. The first wireless position signal generator 128-1, the second wireless position signal generator 128-2 and the third wireless position signal generator 128-3 are, for example but not limited to, Bluetooth signal generators. The first wireless position signal 130-1, the second wireless position signal 130-2 and the third wireless position signal 130-3 are, for example but not limited to, Bluetooth position signals. The first position identification code 132-1, the second position identification code 132-2 and the third position identification code 132-3 are, for example but not limited to, Bluetooth position identification codes. The first wireless signal intensity value 134-1, the second wireless signal intensity value 134-2 and the third wireless signal intensity value 134-3 are, for example but not limited to, Bluetooth signal intensity values. Besides the Bluetooth technology, the present invention can also be applied to the Wi-Fi technology or the ZigBee technology or other radio frequency wireless positioning technologies.

In other words, compared with the embodiment of FIG. 2, the embodiment of FIG. 3 increases the wireless position signal receiving unit 126, the first wireless position signal generator 128-1, the second wireless position signal generator 128-2 and the third wireless position signal generator 128-3 to synthetically consider the position identification codes, the wireless signal intensity values, the handheld apparatus action signal 124, the optical identification codes and the light intensity values to obtain the more accurate positioning information 116. For example, sometimes the light is blocked out, and at this time the position identification codes and the wireless signal intensity values can provide the auxiliary positioning.

Figure 5:
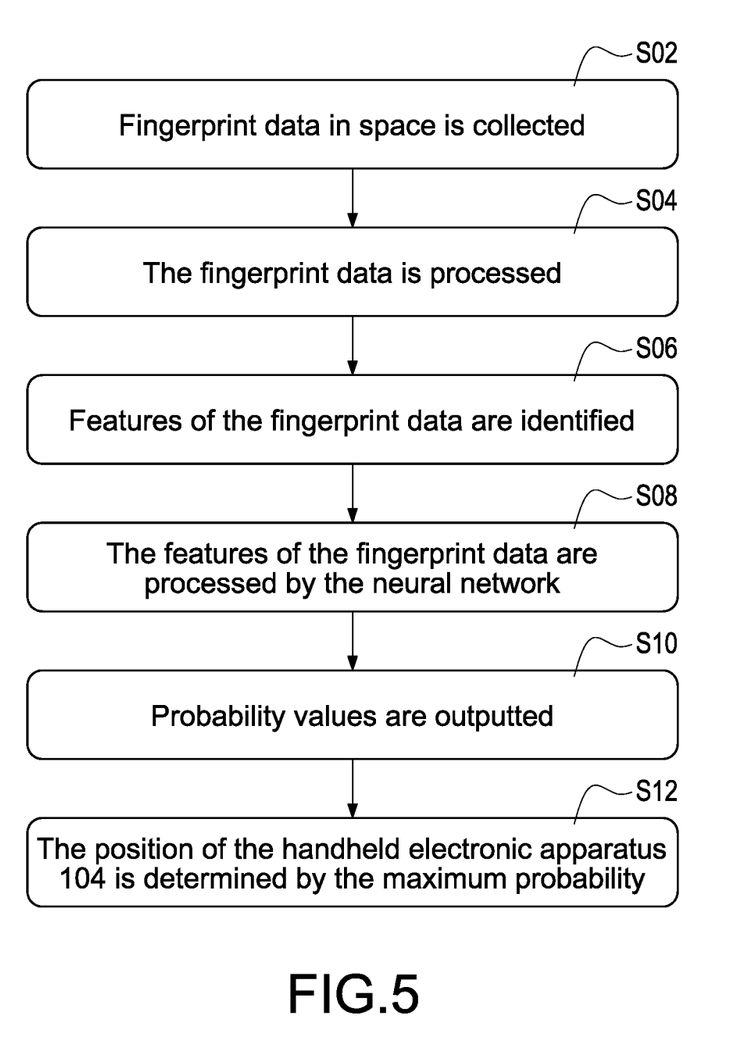
FIG. 5 shows a flow chart of an embodiment of the present invention.

FIG. 5 shows a flow chart of an embodiment of the present invention. Please refer to FIG. 3 at the same time. The process of the present invention comprises following steps:

Step S02: Fingerprint data in space is collected. Namely, the optical code receiving unit 106 receives the first optical code signal 110-1, the second optical code signal 110-2 and the third optical code signal 110-3. The inertial sensor 122 senses the action state of the handheld electronic apparatus 104. The wireless position signal receiving unit 126 receives the first wireless position signal 130-1, the second wireless position signal 130-2 and the third wireless position signal 130-3. Then, the process of the present invention goes to a step S04.

Step S04: The fingerprint data is processed. Namely, the optical code receiving unit 106 processes the first optical code signal 110-1, the second optical code signal 110-2 and the third optical code signal 110-3 to obtain the optical identification codes and the light intensity values. The inertial sensor 122 senses the action state of the handheld electronic apparatus 104 to obtain the handheld apparatus action signal 124. The wireless position signal receiving unit 126 processes the first wireless position signal 130-1, the second wireless position signal 130-2 and the third wireless position signal 130-3 to obtain the position identification codes and the wireless signal intensity values. Then, the process of the present invention goes to a step S06.

Step S06: Features of the fingerprint data are identified. Namely, the artificial intelligence positioning algorithm unit 108 receives the optical identification codes, the light intensity values, the handheld apparatus action signal 124, the position identification codes and the wireless signal intensity values. The artificial intelligence positioning algorithm unit 108 identifies features of the optical identification codes, the light intensity values, the handheld apparatus action signal 124, the position identification codes and the wireless signal intensity values. Then, the process of the present invention goes to a step S08.

Step S08: The features of the fingerprint data are processed by the neural network. Namely, the artificial intelligence positioning algorithm unit 108 processes the features of the optical identification codes, the light intensity values, the handheld apparatus action signal 124, the position identification codes and the wireless signal intensity values by the neural network. Then, the process of the present invention goes to a step S10.

Step S10: Probability values are outputted. Namely, the probabilities of different positions of the handheld electronic apparatus 104 are calculated. Then, the process of the present invention goes to a step S12.

Step S12: The position of the handheld electronic apparatus 104 is determined by the maximum probability. Namely, the artificial intelligence positioning algorithm unit 108 obtains the positioning information 116.

Figure 6:
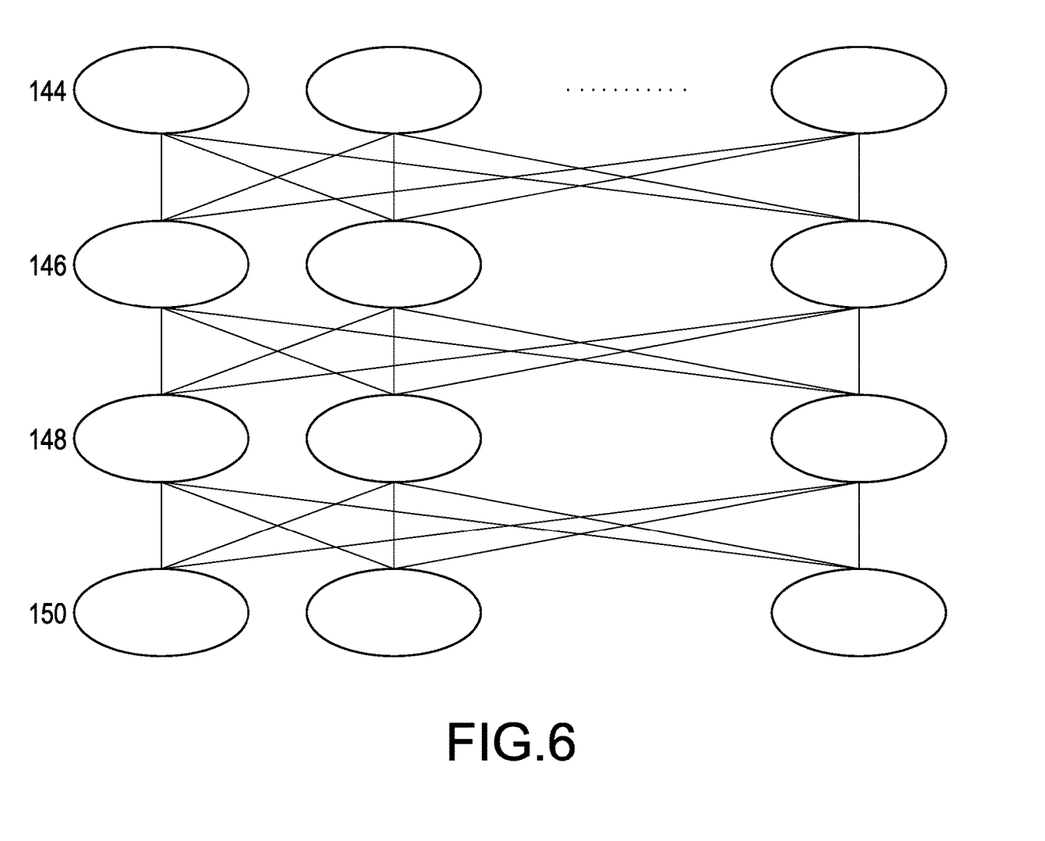
FIG. 6 shows the processing of the neural network of the present invention.

FIG. 6 shows the processing of the neural network of the present invention. FIG. 6 is used to describe the step S08 of FIG. 5 in detail. The processing of the neural network of the present invention comprises an input layer 144, a first hidden layer 146, a second hidden layer 148 and an output layer 150. The first hidden layer 146 comprises 256 neurons. The second hidden layer 148 comprises 256 neurons.

The advantage of the present invention is to improve the accuracy of the indoor positioning without increasing the quantity of the lamp apparatuses. For example, the accuracy can achieve to be less than the distance between the lamp apparatuses, and even the accuracy can achieve to be the centimeter level. Features of the visible light allow its positioning accuracy to be higher than the positioning accuracy of the radio frequency wireless positioning technology.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An intelligent positioning system comprising:
at least one lamp apparatus; and
a handheld electronic apparatus wirelessly connected to the at least one lamp apparatus,
wherein the handheld electronic apparatus comprises:
an optical code receiving unit wirelessly connected to the at least one lamp apparatus;
an artificial intelligence positioning algorithm unit electrically connected to the optical code receiving unit;
a display unit electrically connected to the artificial intelligence positioning algorithm unit; and
a neural network operation acceleration unit electrically connected to the artificial intelligence positioning algorithm unit,
wherein the at least one lamp apparatus is configured to wirelessly transmit an optical code signal to the optical code receiving unit; after the optical code receiving unit receives the optical code signal, the optical code receiving unit is configured to analyze the optical code signal to obtain an optical identification code of the optical code signal and a light intensity value of the optical code signal; after the optical code receiving unit obtains the optical identification code of the optical code signal and the light intensity value of the optical code signal, the optical code receiving unit is configured to transmit the optical identification code of the optical code signal and the light intensity value of the optical code signal to the artificial intelligence positioning algorithm unit; after the artificial intelligence positioning algorithm unit receives the optical identification code of the optical code signal and the light intensity value of the optical code signal, the artificial intelligence positioning algorithm unit is configured to convert the optical identification code of the optical code signal and the light intensity value of the optical code signal into a positioning information;
wherein after the artificial intelligence positioning algorithm unit converts the optical identification code of the optical code signal and the light intensity value of the optical code signal into the positioning information, the artificial intelligence positioning algorithm unit is configured to transmit the positioning information to the display unit; after the display unit receives the positioning information, the display unit is configured to display the positioning information;
wherein the neural network operation acceleration unit is configured to assist the artificial intelligence positioning algorithm unit to convert the optical identification code of the optical code signal and the light intensity value of the optical code signal into the positioning information.

2. The intelligent positioning system in claim 1, wherein the artificial intelligence positioning algorithm unit is a deep neural network model.

3. The intelligent positioning system in claim 1, wherein the optical code receiving unit is an optical code receiver.

4. The intelligent positioning system in claim 1, wherein the optical code signal is a visible light optical code signal.

5. The intelligent positioning system in claim 1, wherein the neural network operation acceleration unit is a graphics processing unit.

6. The intelligent positioning system in claim 1, wherein the handheld electronic apparatus further comprises:
an inertial sensor electrically connected to the artificial intelligence positioning algorithm unit, wherein the inertial sensor is configured to sense an action state of the handheld electronic apparatus to generate a handheld apparatus action signal; after the inertial sensor generates the handheld apparatus action signal, the inertial sensor is configured to transmit the handheld apparatus action signal to the artificial intelligence positioning algorithm unit; after the artificial intelligence positioning algorithm unit receives the handheld apparatus action signal, the optical identification code of the optical code signal and the light intensity value of the optical code signal, the artificial intelligence positioning algorithm unit is configured to convert the handheld apparatus action signal, the optical identification code of the optical code signal and the light intensity value of the optical code signal into the positioning information.

7. The intelligent positioning system in claim 6, wherein the handheld electronic apparatus further comprises:
   a wireless position signal receiving unit electrically connected to the artificial intelligence positioning algorithm unit,
   wherein the at least one lamp apparatus comprises:
   a wireless position signal generator wirelessly connected to the wireless position signal receiving unit,
   wherein the wireless position signal generator is configured to wirelessly transmit a wireless position signal to the wireless position signal receiving unit; after the wireless position signal receiving unit receives the wireless position signal, the wireless position signal receiving unit is configured to analyze the wireless position signal to obtain a position identification code of the wireless position signal and a wireless signal intensity value of the wireless position signal; after the wireless position signal receiving unit obtains the position identification code of the wireless position signal and the wireless signal intensity value of the wireless position signal, the wireless position signal receiving unit is configured to transmit the position identification code of the wireless position signal and the wireless signal intensity value of the wireless position signal to the artificial intelligence positioning algorithm unit; after the artificial intelligence positioning algorithm unit receives the position identification code of the wireless position signal, the wireless signal intensity value of the wireless position signal, the handheld apparatus action signal, the optical identification code of the optical code signal and the light intensity value of the optical code signal, the artificial intelligence positioning algorithm unit is configured to convert the position identification code of the wireless position signal, the wireless signal intensity value of the wireless position signal, the handheld apparatus action signal, the optical identification code of the optical code signal and the light intensity value of the optical code signal into the positioning information.

8. The intelligent positioning system in claim 7, wherein the wireless position signal receiving unit is a bluetooth signal receiver; the wireless position signal generator is a bluetooth signal generator; the wireless position signal is a bluetooth position signal; the position identification code is a bluetooth position identification code; the wireless signal intensity value is a bluetooth signal intensity value.

9. The intelligent positioning system in claim 7, wherein the handheld electronic apparatus further comprises:
   a data collector electrically connected to the artificial intelligence positioning algorithm unit,
   wherein after the display unit displays the positioning information, the data collector is configured to collect a merchandise identification code of a merchandise.

10. The intelligent positioning system in claim 9, wherein the data collector is a barcode scanner or a wireless radio frequency identification reader.

* * * * *